(12) United States Patent
Nafziger et al.

(10) Patent No.: US 10,111,379 B2
(45) Date of Patent: *Oct. 30, 2018

(54) CONTROL SYSTEM FOR CONTROLLING HEADER SPEED OF AN AGRICULTURAL VEHICLE

(71) Applicant: AGCO Corporation, Hesston, KS (US)

(72) Inventors: Brendon Nafziger, Canton, KS (US); Daniel James Soldan, Hillsboro, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,052

(22) Filed: Sep. 13, 2017

(65) Prior Publication Data

US 2018/0084714 A1 Mar. 29, 2018

Related U.S. Application Data

(63) Continuation of application No. 14/913,214, filed on Feb. 19, 2016, now Pat. No. 9,788,480.

(51) Int. Cl.
*A01D 34/44* (2006.01)
*A01D 34/56* (2006.01)
*A01D 34/00* (2006.01)
*A01D 41/127* (2006.01)
*A01D 34/66* (2006.01)
*A01D 41/14* (2006.01)
*A01D 101/00* (2006.01)

(52) U.S. Cl.
CPC ......... *A01D 34/006* (2013.01); *A01D 34/008* (2013.01); *A01D 34/664* (2013.01); *A01D 41/127* (2013.01); *A01D 41/1274* (2013.01); *A01D 41/142* (2013.01); *A01D 2101/00* (2013.01)

(58) Field of Classification Search
CPC .. A01D 34/008; A01D 34/006; A01D 34/664; A01D 41/142; A01D 41/127; A01D 41/1274
USPC .................... 56/10.2 G, 10.8, 11.1
See application file for complete search history.

(56) References Cited

U.S. PATENT DOCUMENTS

| 4,458,471 A * | 7/1984 | Herwig ............. A01D 41/1274 460/6 |
| 7,958,706 B2 * | 6/2011 | Remillard ............. A01D 57/02 56/10.2 G |
| 8,113,033 B2 * | 2/2012 | Fackler .................. A01D 57/20 56/10.2 G |

(Continued)

*Primary Examiner* — John Weiss

(57) ABSTRACT

A control system and method for adjusting a rotational speed of a header on an agricultural vehicle based on ground speed of the agricultural vehicle. The header may include a plurality of cutters rotatably actuated with a header actuator. The control system may have a processor that compares a ground speed of the agricultural vehicle with a threshold ground speed. If the ground speed of the agricultural vehicle is below the threshold ground speed, the processor may command the header actuator to rotate the cutters at a constant predetermined rotational speed. If the ground speed of the agricultural vehicle is above the threshold ground speed, the processor may command the header actuator to increase rotational speed of the cutters in proportion to the ground speed of the agricultural vehicle.

6 Claims, 4 Drawing Sheets

(56) References Cited

U.S. PATENT DOCUMENTS

| | | | | |
|---|---|---|---|---|
| 8,465,105 B2* | 6/2013 | Parker | ............ | E01C 23/088 299/39.4 |
| 9,179,600 B2* | 11/2015 | Kraus | ............ | A01F 29/14 |
| 2015/0342118 A1* | 12/2015 | Corbett | ............ | A01D 41/127 73/114.25 |
| 2017/0064904 A1* | 3/2017 | Figgins | ............ | A01D 41/141 |

* cited by examiner

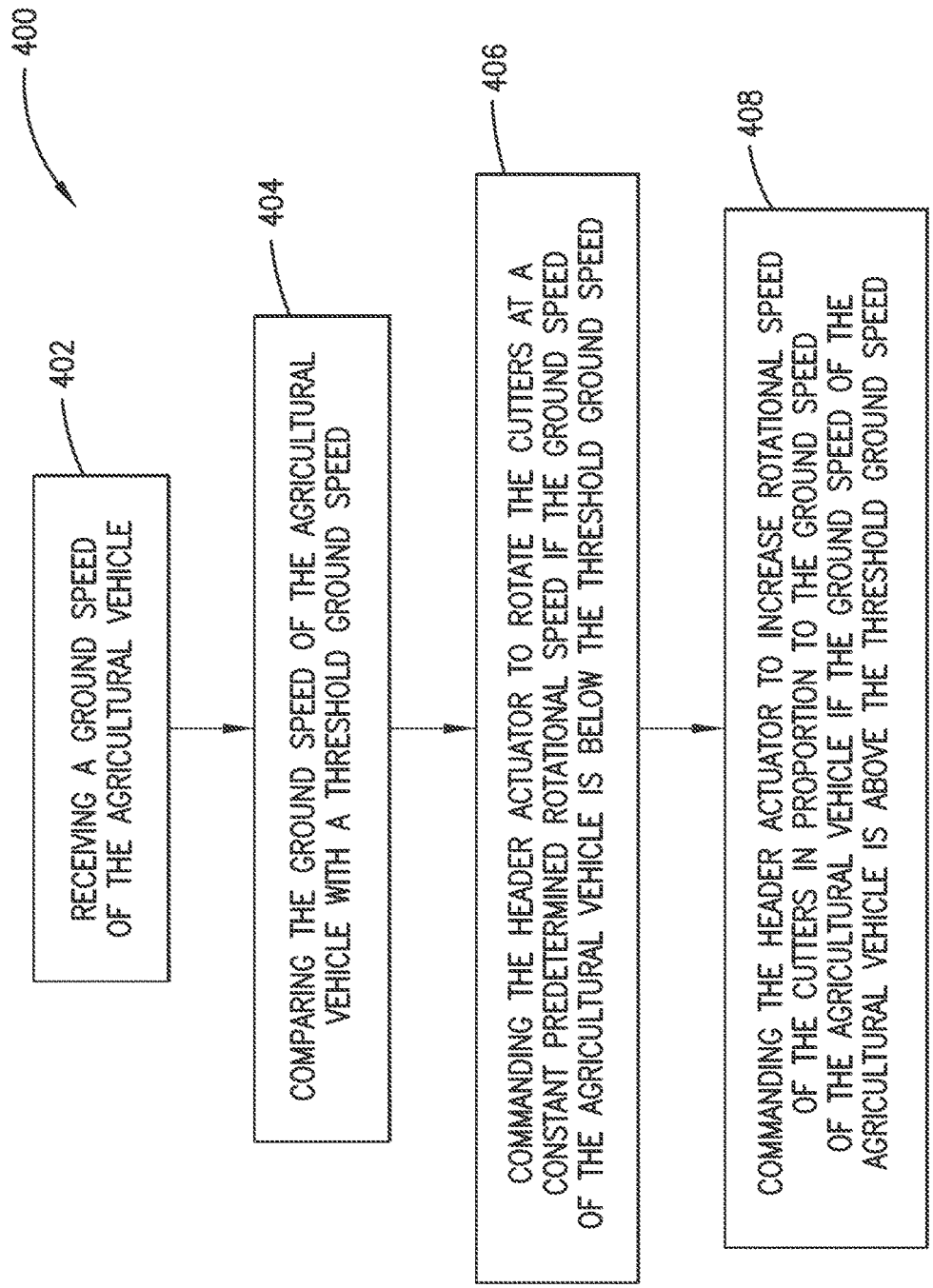

CONTROL SYSTEM FOR CONTROLLING HEADER SPEED OF AN AGRICULTURAL VEHICLE

CROSS REFERENCE TO RELATED APPLICATION

This application is a continuation of U.S. patent application Ser. No. 14/913,214, filed Feb. 19, 2016, now U.S. Pat. No. 9,788,480. The full disclosure, in its entirety, of U.S. patent application Ser. No. 14/913,214, is hereby incorporated by reference.

BACKGROUND OF THE INVENTION

Field of Invention

This invention relates to harvesting header used on agricultural vehicle for harvesting an agricultural crop, and more particularly to a control system for a header that adjusts the rotational speed of the rotary cutters on the header according to a ground speed of the agricultural vehicle.

Description of Related Art

Harvesters or windrowers are self-propelled or tractor-drawn farm implements used to mow a field and arrange mown crop in rows or "windrows." Some windrowers, such as disc windrowers, use headers including rotating blades to cut stalks of grain or other crops. The rotational speed of a disc windrower header can have a significant effect on the quality of "cutoff" or how cleanly the stalks are cut.

In many crops, a rotational speed much less than the maximum available speed is desirable to achieve the best cut quality. However, when operating at the very high ground speeds achievable by modern windrowers, a slower-rotating knife may be forced to cut more than it is capable. The result may be increased streaking, generally ragged-looking stubble, overly-long stems, stems that have been torn instead of cut cleanly, or clumps or strips of stems that are longer than others.

OVERVIEW OF THE INVENTION

In one embodiment, the invention is directed to a control system for an agricultural vehicle that adjusts header speeds according to a ground speed of the agricultural vehicle. The agricultural vehicle may have a frame, wheels upon which the frame travels, and a header attached to and located forward of the frame. The header may include a plurality of cutters rotatably actuated with a header actuator. The control system may have a processor for comparing a ground speed of the agricultural vehicle with a threshold ground speed. If the ground speed of the agricultural vehicle is below the threshold ground speed, the processor may command the header actuator to rotate the cutters at a constant predetermined rotational speed. If the ground speed of the agricultural vehicle is above the threshold ground speed, the processor may command the header actuator to increase rotational speed of the cutters in proportion to the ground speed of the agricultural vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

Embodiments of the present invention are described in detail below with reference to the attached drawing figures, wherein:

FIG. 4 is a flow chart of a method of controlling rotary speeds of cutters of the header in accordance with an embodiment of the invention.

Figure 1:
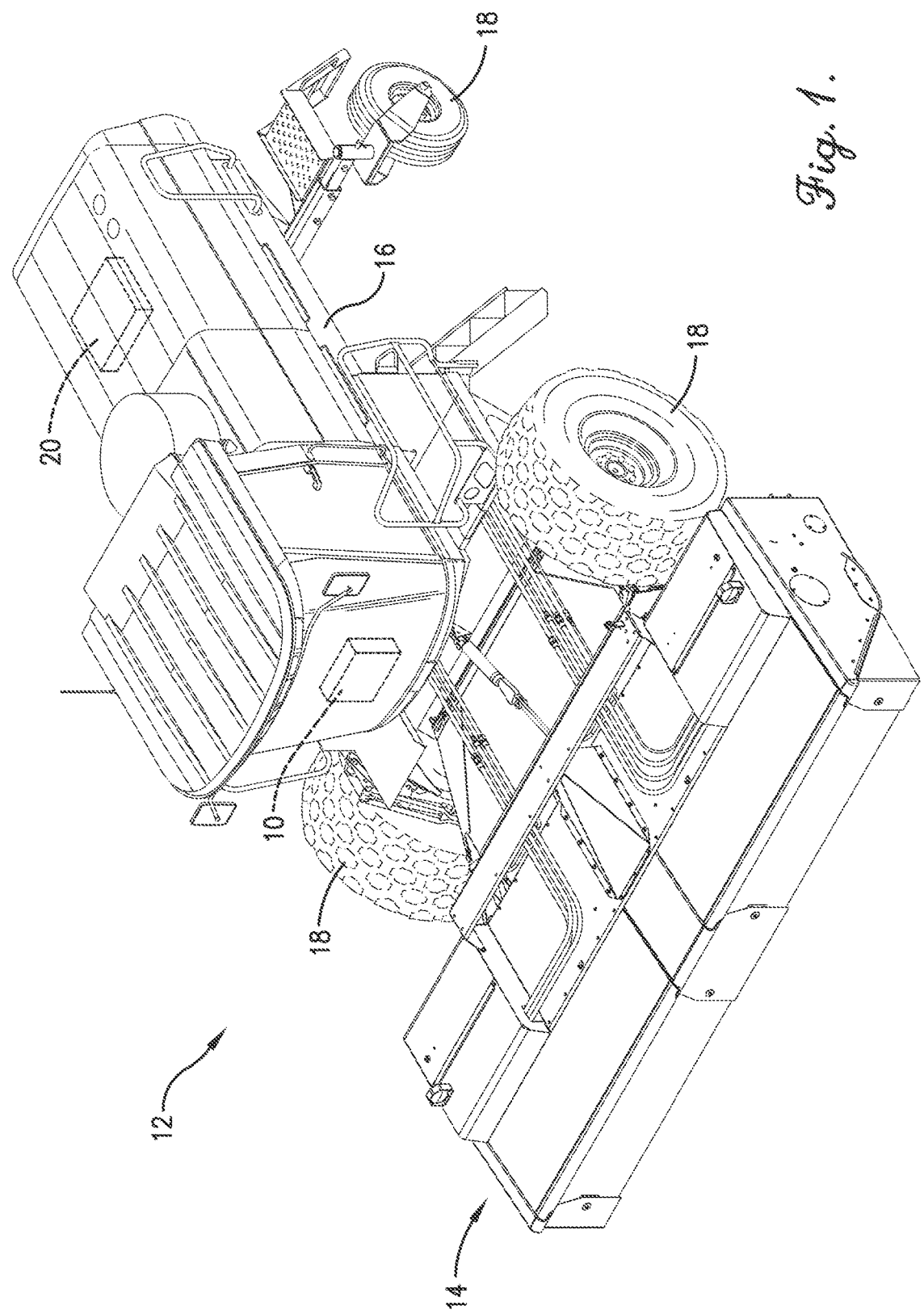
FIG. 1 is a perspective view of an agricultural vehicle in which a control system of the present invention may be used.

The drawing figures do not limit the present invention to the specific embodiments disclosed and described herein. The drawings are not necessarily to scale, emphasis instead being placed upon clearly illustrating the principles of the invention.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

As illustrated in FIG. 1, the present invention is a control system 10 for adjusting header speeds of an agricultural vehicle 12. The agricultural vehicle 12 may comprise at least one header 14 configured for cutting stalks of grain or other crops. The agricultural vehicle 12 may further comprise a frame 16, wheels 18, and a ground speed control actuator 20. The agricultural vehicle 12 may be a harvester, a windrower, or any other agricultural vehicle having headers or similar rotary blade configurations.

The wheels 18 may be rotatably attached to the frame 16 and may support the frame 16 a distance above the ground. The ground speed control actuator 20 may be an engine, motor, or any actuator configured to actuate the wheels 18, thus propelling the frame 16 forward or backwards. Furthermore, the ground speed control actuator 20 may be configured to receive commands from and be controlled by elements of the control system 10, as described below, thus varying the rotational speed of the wheels 18 and the ground speed of the agricultural vehicle 12.

Figure 2:
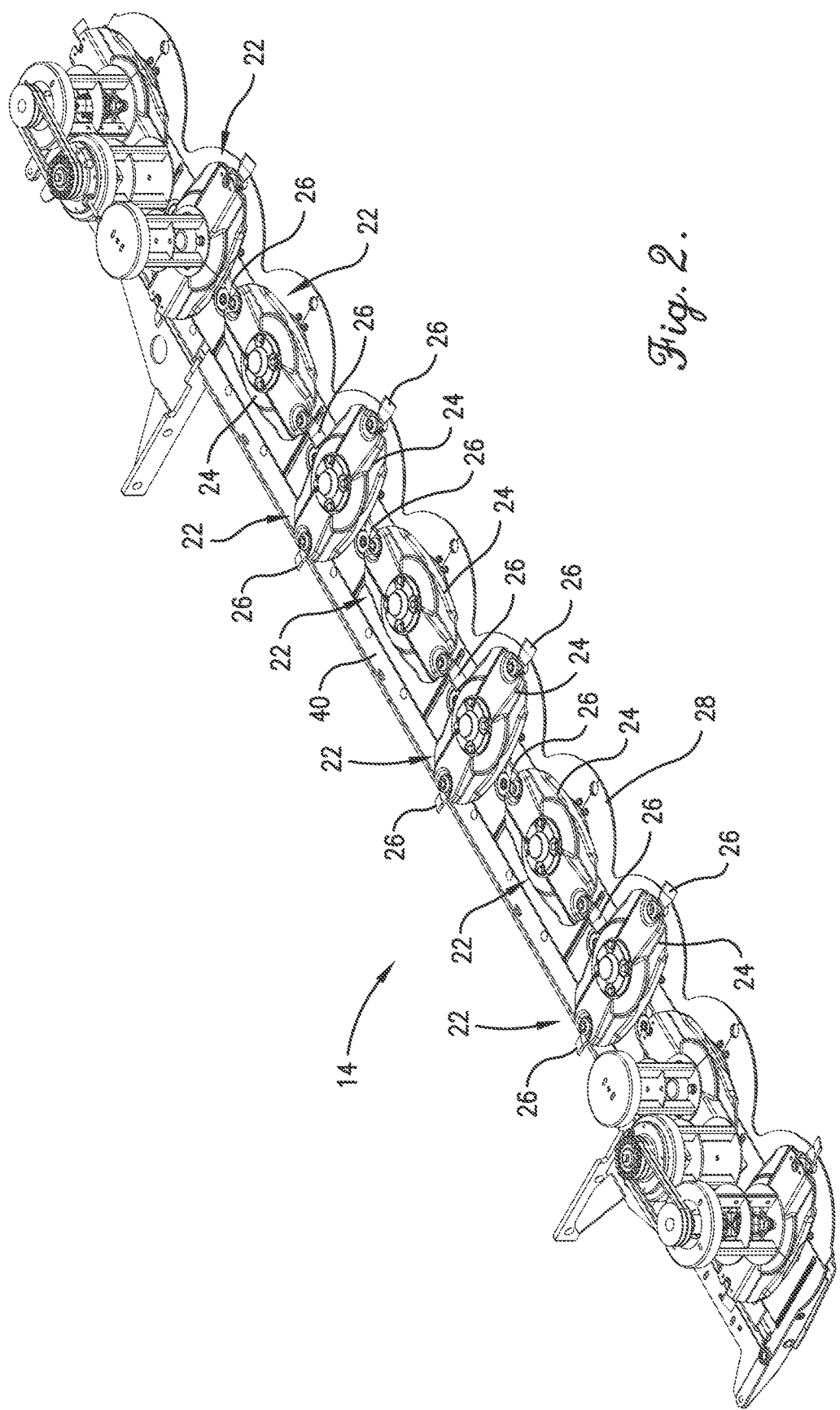
FIG. 2 is a plan view of a header of the agricultural vehicle of FIG. 1.

The header 14, also sometimes referred to as a rotary cutter bed, may be any header known in the art, such as the header and rotary cutter bed described in U.S. patent application Ser. No. 13/348,735, incorporated herein by reference in its entirety. As illustrated in FIG. 2, the header may comprise one or more rotary cutters 22. The rotary cutters 22 may include discs 24 with blades 26 attached thereto. For example, the discs 24 may be rotatably attached to the frame 16 of the agricultural vehicle 12 and/or to a support beam 40 attached to and configured to be pushed in front of the frame 16 as the agricultural vehicle 12 travels forward. The discs 24 may rotate in a plane substantially perpendicular to a plane in which the wheels 18 of the agricultural vehicle 12 rotate. As illustrated in FIG. 2, the discs 24 may be substantially oval or oblong and may have two blades 26 or knives affixed thereto and extending from opposing ends thereof.

In some embodiments of the invention, cutters of opposite rotational orientations are arranged in alternating succession. Specifically, the cutters 22 may be ninety degrees out of phase with respect to the adjacent cutters 22, particularly if circular paths of travel of the blades 26 of adjacent cutters 22 overlap one another and therefore must be appropriately out of phase in order to avoid striking each other. The header 14 may also comprise a positive mechanical drive connection between the cutters 22 or discs 24 such that the cutters 22 or discs 24 remain properly in phase with one another when actuated to rotate at any speed.

The header 14 may also comprise a rock guard 28 attached to the support beam 40 of the header 14 and/or the frame 16 of the agricultural vehicle 12. The rock guard 28 may be a rigid plate or a series of rigid plates fixed relative to each other and mounted below the header discs 24. As illustrated in FIG. 2, the rock guard 28 may extend further forward (relative to a direction of travel of the agricultural vehicle 12) than the discs 24, while still allowing at least a portion of the blades 26 to extend outward beyond the rock guard 28 as the discs 24 rotate.

Figure 3:
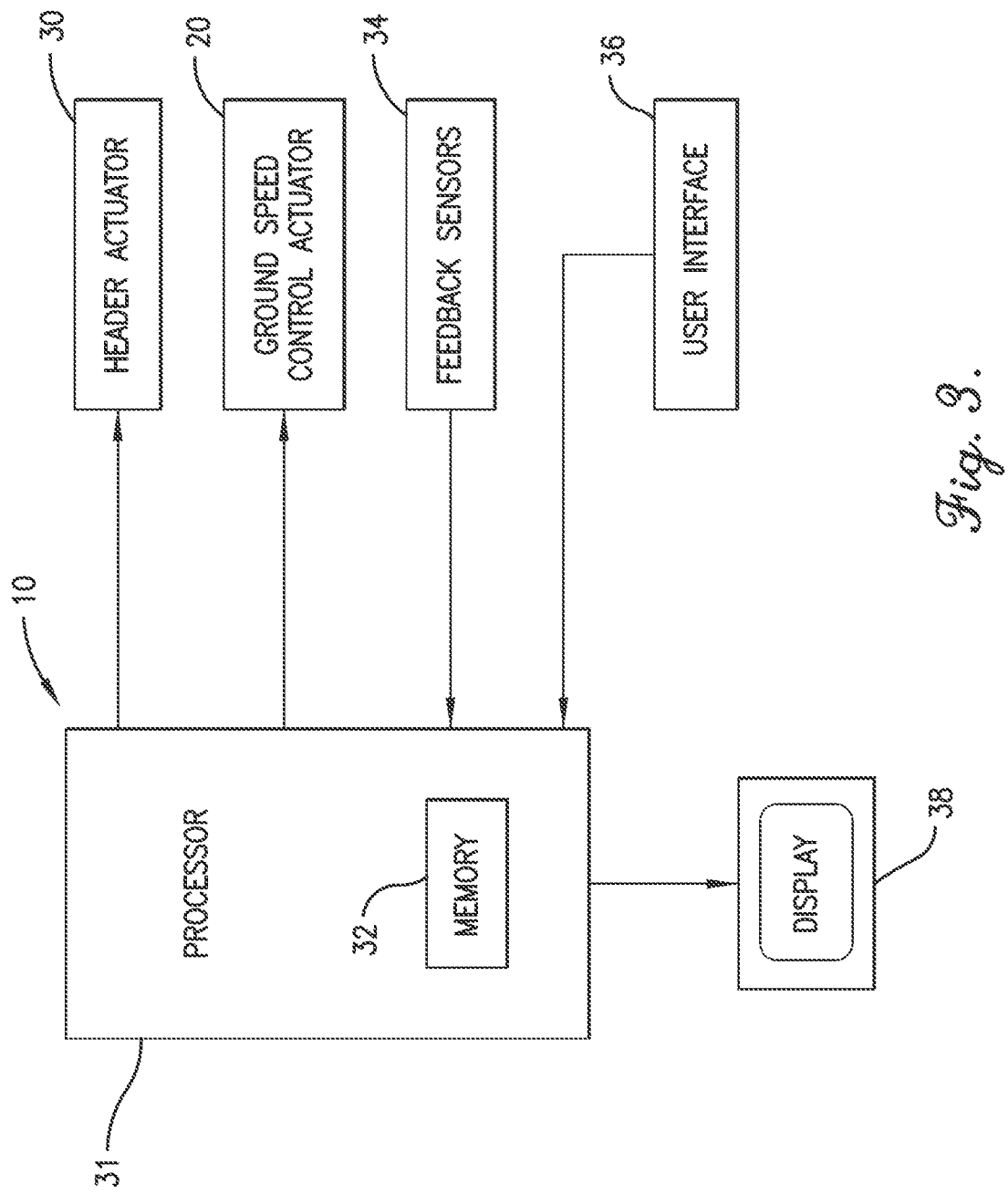
FIG. 3 is a block diagram showing the control system and other control elements of the agricultural vehicle of FIG. 1.

As illustrated in FIG. 3, the header may also comprise at least one header actuator 30 configured to rotate the discs 24 in a synchronized manner. The header actuator 30 may include gearboxes and motors, such as hydraulic motors, and/or other electromechanical or hydraulic devices known in the art. The header actuator 30 may be communicably coupled with the control system 10 and may be configured to receive command and control signals from elements of the control system 10, as later described herein, to vary a rotational speed of the discs 24

The control system 10 is configured to monitor and adjust ground speed and/or rotational speed of the discs 24 of the header 14. As illustrated in FIG. 3, an embodiment of the control system 10 may comprise a processor 31, memory 32, feedback sensors 34, a user interface 36, a display 38, and other standard control components known in the art. Furthermore, in some embodiments of the invention, the control system 10 may also comprise the actuators 20, 30 described above.

The processor 31 may comprise any number and type of computer processors, servers, controllers, integrated circuits, programmable logic devices, or other computing devices and resident or external memory, such as the memory 32, for storing data, executable code segments, images, and other information accessed and/or generated by the control system 10 or processor 31. In some embodiments of the invention, the control system 10 may be a windrower or harvester control system configured to monitor and/or control a variety of actuators, motors, sensors, and systems of the windrower or agricultural vehicle.

The processor 31 may have a computer program, algorithms, and/or code segments stored thereon or accessible thereby for performing the method steps and other functions described herein. The computer program preferably comprises an ordered listing of executable instructions for implementing logical functions in the processor 31. The computer program can be embodied in any computer-readable medium for use by or in connection with an instruction execution system, apparatus, or device, and execute the instructions. In the context of this application, a "computer-readable medium" can be any system and/or device that can contain, store, communicate, propagate, or transport the program for use by or in connection with an instruction execution system, apparatus, or device. The computer-readable medium can be, for example, but not limited to, an electronic, magnetic, optical, electromagnetic, infrared, or semi-conductor system, apparatus or device. More specific, although not inclusive, examples of the computer-readable medium would include the following: an electrical connection having one or more wires, data storage devices such as hard disc drives or solid-state drives, a portable computer diskette, a random access memory (RAM), a read-only memory (ROM), an erasable, programmable, read-only memory (EPROM or Flash memory), an optical fiber, and a portable compact disc read-only memory (CDROM).

As illustrated in FIG. 3, the processor 31 is preferably coupled with the header actuator 30 and/or the ground speed control actuator 20 through wired or wireless connections to enable command signals from the control system 10 to be transmitted to the actuators 20, 30. The processor 31 and various components thereof may be distributed throughout various locations on the agricultural vehicle 12 and/or located remotely from, but still communicably coupled with, the actuators 20,30, feedback sensors 34, user interface 36, and/or display 38. For example, the processor 31 and/or the memory 32 may be located in the cab portion of the frame 20, but may be located at any location on the agricultural vehicle 12 or remote from the agricultural vehicle 12 without departing from the scope of the invention.

The memory 32 may include, for example, removable and non-removable memory elements such as RAM, ROM, flash, magnetic, optical, USB memory devices, and/or other conventional memory elements. The memory 32 may store various data associated with the agricultural vehicle 12, such as the computer program and code segments mentioned above, or other data for instructing the processor 31 and/or other elements of the control system 10 to perform the steps described herein. Further, the memory 32 may store data retrieved from any of the feedback sensors 34 or the actuators 20, 30. The various data stored within the memory 32 may also be associated within one or more databases to facilitate retrieval of the information.

The feedback sensors 34 may be any sensors or measurement devices known in the art configured to communicate with the processor 31. For example, at least some of the feedback sensors 34 may be configured to provide data corresponding to a current ground speed of the agricultural vehicle 12 and/or a current rotary speed of the header 14. The feedback sensors 34 may also provide information regarding geographic location, location within a field, amount of fuel remaining, various external and internal temperatures, and/or any other sensor readings known in the art. In some embodiments of the invention, the feedback sensors 34 are existing sensors of the agricultural vehicle 12 communicably coupled with the processor 31, such as vehicle speed sensors known in the art. The feedback sensors 34 may be located at various locations on the frame 16, wheels 18, and/or header 14.

The user interface 36 may permit a user to operate the agricultural vehicle 12 and enables users, third parties, or other devices to share information with the control system 10 and/or the processor 31. The user interface 36 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the user interface 36 may comprise wired or wireless data transfer elements such as removable memory, data transceivers, etc., to enable the user and other devices or parties to remotely interface with the processor 31. The user interface 36 may also include a speaker for providing audible instructions and feedback. The user interface 36 may be located in a cab portion of the frame 20 for use by an operator therein.

The display 38 may comprise a graphical interface operable to display visual graphics, images, text, etc. in response to external or internal processes and commands. For example, the display 38 may comprise conventional black and white, monochrome, or color display elements including CRT, TFT, LCD, and/or LED display devices. The display 38 may be integrated with the user interface 36, such as in embodiments where the display is a touch screen display to enable the user to interact with it by touching or pointing at display areas to provide information or selections to the processor 31. The display 38 may be communicably coupled with and/or an integral component of the control system 10 and may be operable to display various information corresponding to the ground speed of the agricultural vehicle 12, a predetermined threshold ground speed of the agricultural vehicle 12, header speeds, etc. As with the user interface 36, the display 38 may be located in the cab portion of the frame 20 for use by the operator therein.

In use, the header's rotational speed is adjusted when the ground speed exceeds a certain threshold. For example, an operator of the agricultural vehicle 12 may set a header rotational speed generally appropriate for a given crop. At speeds up to a threshold ground speed, the header rotational speed (or rotational speed of the disks 24) may be held at the value input by the operator. However, once the ground speed exceeds the threshold ground speed, the header rotational speed may begin speeding up in proportion to the ground speed. This reduces a length of cut that each blade 26 or knife is required to make at higher ground speeds, which may result in improved cut quality of the crops being cut by the header 14. At the same time, this method avoids cut-off problems and increased power requirements that high header rotational speeds can cause at low ground speeds.

The flow chart of FIG. 4 depicts the steps of an exemplary method 400 of controlling the rotational speed of the header 14 based on ground speed of the agricultural vehicle 12 in more detail. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In some embodiments of the invention, at least some of the blocks in FIG. 4 may represent code segments executable by the control system 10 and/or the processor 31.

As illustrated in FIG. 4, the method 400 may include a step of receiving a ground speed of the agricultural vehicle, as depicted in block 402. The ground speed may be sensed using the feedback sensors 34 or any methods known in the art for determining ground speed of a vehicle. For example, the ground speed may be provided to the control system 10 or processor 31 in miles per hour (mph) or kilometers per hour. Next, the method 400 may include the steps of comparing the ground speed of the agricultural vehicle 12 with a threshold ground speed, as depicted in block 404, and commanding the header actuator 30 to rotate the cutters 22 at a constant predetermined rotational speed if the ground speed of the agricultural vehicle 12 is below the threshold ground speed, as depicted in block 406. Finally, the method 400 may include a step of commanding the header actuator 30 to increase the rotational speed of the cutters 22 in proportion to the ground speed of the agricultural vehicle 12 if the ground speed is above the threshold ground speed, as depicted in block 408.

In one example embodiment of the invention, the agricultural vehicle may be a MASSEY FERGUSON WR9770 windrower, manufactured by AGCO Corporation of Duluth, Ga., and may have a maximum disc header speed of 2500 rpm and a maximum ground speed of 16 miles per hour (mph). Each disc may have two blades, as illustrated in FIG. 2, giving a minimum cut length of 3.4 inches while traveling at full speed. This gives acceptable cutoff even though the blades project only 2 inches in front of the rock guard. However, when the cut length begins to approach 4 inches, the stubble left behind begins to get a ragged look, since more of the crop is bent over by the rock guards prior to being severed. At 16 mph, a disc speed of approximately 2100 rotations per minute (rpm) is required to achieve a 4 inch cut length. This can be calculated using the following relationship: (cut length in inches)=528*(ground speed in mph)/(disc speed in rpm). The value 528 is calculated from 1 mph being equal to 1056 inches per minute divided by the two cuts per disc rotation.

There are many crop conditions that are typically cut at disc speeds slower than 2100 rpm. For example, 1800-1900 rpm is a typical speed for light to average alfalfa. Disc speeds this slow reduce wear on the header, produce less noise, and require less power, so it is desirable to operate as slowly as possible while still doing an acceptable job. At 1800 rpm, the maximum ground speed possible without exceeding a 4 inch cut length is 13.6 mph. Using the methods described herein, the header 14 or cutters 22 would automatically begin speeding up when the ground speed exceeds this threshold to maintain the maximum allowable cut length. In some embodiments of the invention, the operator may dial in (via the user interface) a maximum ground speed and/or cut length desired for a particular crop condition. Furthermore, in some embodiments of the invention, the operator may have an option of turning off this feature altogether, so that the speed of the header is not adjusted based on the ground speed.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An agricultural vehicle comprising:
   a frame;
   a plurality of wheels attached to the frame;

a ground speed control actuator configured to rotate at least one of said plurality of wheels to effectuate movement of the agricultural vehicle at a desired ground speed;

a harvesting header attached to the frame, the header comprising a plurality of rotary cutters, wherein each rotary cutter has a rotating disc with at least one blade extending therefrom, said blade configured for cutting crops;

a rock guard mounted below the rotating discs of the header;

a header actuator configured to actuate rotation of each of the rotating discs; and a processor configured for:
monitoring said ground speed of the agricultural vehicle;
calculating a threshold ground speed based on a predetermined maximum cut length for a particular crop or a particular crop condition, wherein the processor is configured to determine at least one of the threshold ground speed and the maximum cut length based at least partially on a quantity of blades of each cutter and a distance the blades project forward of the rock guard;
comparing the ground speed of the agricultural vehicle with the threshold ground speed;
commanding the header actuator to rotate the discs at a constant predetermined rotational speed if the ground speed of the agricultural vehicle is below the threshold ground speed; and
commanding the header actuator to increase rotational speed of the rotating discs in proportion to the ground speed of the agricultural vehicle if the ground speed of the agricultural vehicle is above the threshold ground speed.

2. The agricultural vehicle of claim 1, further comprising at least one feedback sensor configured to provide the ground speed of the agricultural vehicle to the processor.

3. The agricultural vehicle of claim 1, wherein the agricultural vehicle is a windrower and the processor is a windrower processor communicably coupled with the header actuator configured to rotatably actuate the discs.

4. The agricultural vehicle of claim 1, further comprising a ground speed control actuator configured to actuate the wheels of the agricultural vehicle based on commands received from the processor.

5. The agricultural vehicle of claim 1, further comprising a user interface communicably coupled with the processor, wherein the processor is further configured to receive the threshold ground speed from an operator of the agricultural vehicle via the user interface.

6. A method for controlling the rotational speed of rotary cutters on a harvesting header of an agricultural vehicle, wherein the agricultural vehicle has a ground speed actuator configured to rotate at least one of a plurality of wheels to effectuate movement of the agricultural vehicle at a desired ground speed, and wherein each rotary cutter has a rotating disc with at least one blade extending therefrom, said blade configured for cutting crops, a rock guard mounted below the rotating discs of the header, and the header has a header actuator configured to rotate the rotating discs, the method comprising:

monitoring the ground speed of the agricultural vehicle;
calculating a threshold ground speed based on a predetermined maximum cut length for a particular crop or a particular crop condition, wherein the processor is configured to determine at least one of the threshold ground speed and the maximum cut length based at least partially on a quantity of blades of each cutter and a distance the blades project forward of the rock guard;
comparing the ground speed of the agricultural vehicle with a threshold ground speed;
commanding the header actuator to rotate the discs at a constant predetermined rotational speed if the ground speed of the agricultural vehicle is below the threshold ground speed; and
commanding the header actuator to increase rotational speed of the rotating discs in proportion to the ground speed of the agricultural vehicle if the ground speed of the agricultural vehicle is above the threshold ground speed.

* * * * *